Aug. 5, 1952    F. B. BERGER    2,605,962
INSTANTANEOUS SQUARE-ROOT-EXTRACTING CIRCUIT
Filed Nov. 4, 1944
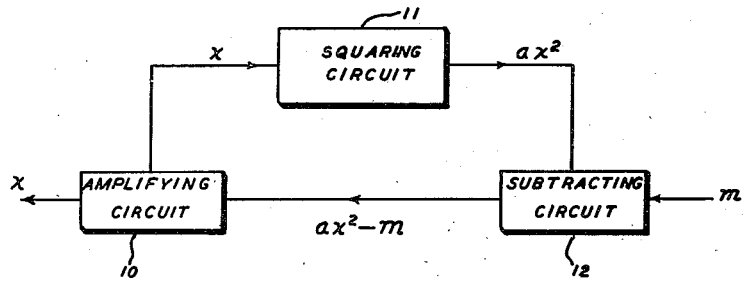
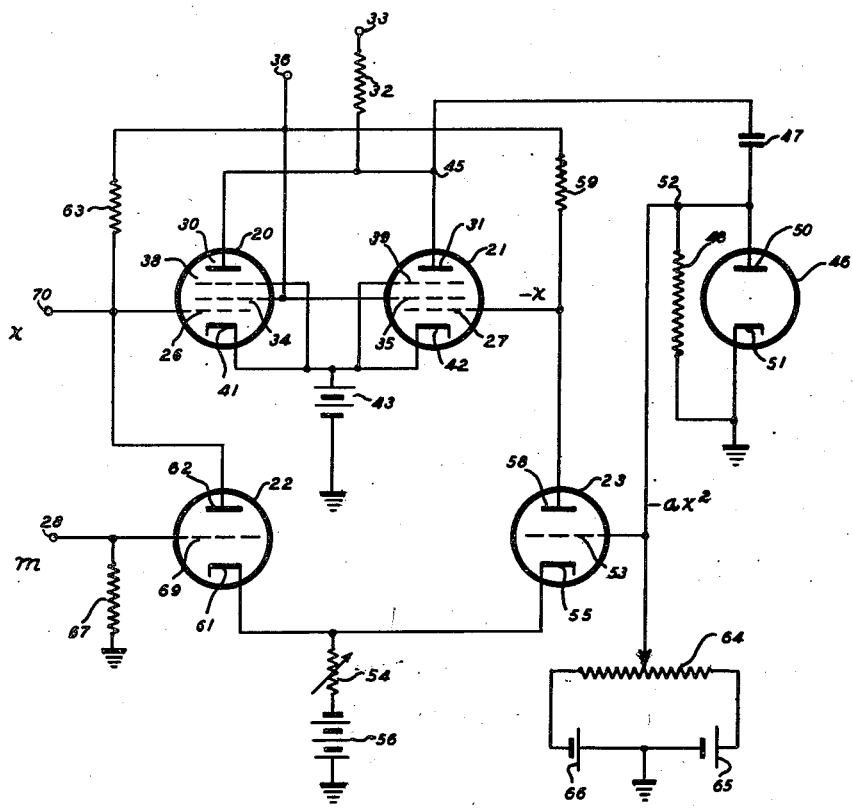
INVENTOR.
FRANCE B. BERGER
BY William D. Hall.
Attorney Patented Aug. 5, 1952

2,605,962

UNITED STATES PATENT OFFICE 2,605,962

INSTANTANEOUS SQUARE-ROOT-EXTRACTING CIRCUIT

France B. Berger, Watertown, Mass., assignors, by mesne assignments, to the United States of America as represented by the Secretary of War Application November 4, 1944, Serial No. 561,995

4 Claims. (Cl. 235—61)

This invention relates generally to electrical computing circuits for producing an output voltage or current which is a given function of an input voltage or current, and more particularly to an electrical system for obtaining an output which varies as the square root of the input.

One object of this invention is to provide an electrical circuit or system which will provide an output voltage whose magnitude is proportional to the square root of the magnitude of the variable input voltage.

Another object of this invention is to provide a circuit in which the output of the circuit responds substantially instantaneously to a change in the input.

Still another object of the present invention is to provide a simple, yet highly accurate and reliable circuit to achieve the above-mentioned objects.

The above and other objects and advantages will appear more fully from the following detailed description together with the accompanying drawings in which:

Fig. 1 is a block diagram of one embodiment of the present invention; and

Fig. 2 represents a schematic circuit diagram of the embodiment shown in block form in Fig. 1.

Referring to Fig. 1, which is a block diagram of one embodiment of the invention, it is seen that the square root extracting circuit may comprise three main portions: an amplifier circuit 10, a squaring circuit 11, and a subtraction circuit 12.

Subtracting circuit 12 may have two inputs, one of which is from squaring circuit 11 and may be represented by the algebraic term $ax^2$; the second input to the subtracting circuit 12 is applied from an external source and is represented by the letter "$m$." The output of the complete square root extracting circuit may be represented by the letter "$x$," and in the present invention "$x$" will be approximately equal to the square root of the input voltage "$m$." Having now set forth the main components of the square root extracting circuit and having introduced and defined the algebraic terminology, the operation of the circuit will now be explained.

For purposes of explanation, the input voltage "$m$" may be considered to be a particular value at one particular moment, and steady-state conditions at this instant will be considered. Furthermore, let it be assumed that the input to squaring circuit 11 is a voltage that may be represented by the letter "$x$." The output of the squaring circuit is then proportional to the square of "$x$" and can be represented by the algebraic term $ax^2$, where "$a$" is a proportionality factor and can be made approximately equal to unity.

The voltage output $ax^2$ from squaring circuit 11 is then fed to subtracting circuit 12 into which input voltage "$m$" is also fed. The output of the subtracting circuit 12 is then the difference between the two, namely, $ax^2-m$.

The voltage output from subtracting circuit 12, namely, $ax^2-m$, may be applied to amplifier 10, said amplifier having a gain G. The voltage output of the amplifier 10 is therefore $G(ax^2-m)$ and may then be fed to the squaring circuit 11.

Previously it was arbitrarily assumed that the input to squaring circuit 11 was "$x$." By the above analysis, however, it has been shown that for steady-state conditions at a particular value of "$m$," "$x$" is actually equal to $G(ax^2-m)$; i. e. $x=G(ax^2-m)$. Dividing both sides of this equation by $Ga$ the algebraic expression $$\frac{x}{Ga}=x^2-\frac{m}{a}$$

is obtained. It may be observed that if G is made large in comparison to "$x$," and "$a$" is approximately equal to unity, the term $$\frac{x}{Ga}$$

may be made negligible. Inasmuch as "$a$" is merely a proportionality factor, it can be made approximately equal to unity by suitable amplification or attenuation. The gain G of amplifier 10 may be made large by a suitable choice of vacuum tube for amplifier 10. As the term $$\frac{x}{Ga}$$

can thus be made negligible, we have left the expression $$x^2-\frac{m}{a}\doteq 0$$

But, if "$a$" is to be made approximately equal to unity, the above expression may be written:

$$x^2-m\doteq 0$$

or $x=\sqrt{m}$. It is apparent then that the output voltage "$x$" may be made to be substantially equal to the square root of the input "$m$."

The squaring circuit 11 is fully described in copending application of France B. Berger and William A. Higinbotham, Serial No. 561,021, filed October 30, 1944, issued May 11, 1948, as Patent No. 2,441,387.

Very briefly the functioning of the squaring circuit is to provide an output voltage whose magnitude varies negatively as the square of the voltage input. The squaring may be obtained by addition of anode currents of two tubes through a common load resistance where the grid voltage applied to the control grid of each tube is substantially similar but of opposite polarity. If this is expressed in algebraic terms wherein the input to the squaring circuit may be represented by the letter "$x$," the voltage output may be represented by the term "$-ax^2$," thus showing that the voltage output varies negatively as the square of the voltage input.

Fig. 2 shows a circuit diagram of one specific embodiment of the system represented by Fig. 1. In this figure the vacuum tubes 20 and 21 perform the squaring function required of squaring circuit 11 of Fig. 1, said squaring circuit operating substantially as described in the aforementioned copending application. Vacuum tubes 22 and 23 provide both the amplification and subtracting function indicated by the amplifier 10 and the subtracting circuit 12 of Fig. 1, the subtracting being provided in the respective grid circuits and common cathode circuit of said vacuum tubes. Vacuum tubes 22 and 23 also enter into the action of the squaring function of the vacuum tubes 20 and 21 by providing substantially similar voltages of opposite polarity to control grids 26 and 27, respectively, of said tubes.

In the particular embodiment shown, the voltage input "$m$" applied to the input terminal 28 is a negative-going voltage and hereinafter will be referred to as "$-m$." It is essential that this voltage be negative-going in this embodiment, in order that the particular subtracting circuit shown herewith functions properly. Should the voltage input at terminal 28 be positive-going, said subtracting circuit will provide addition instead of subtraction. The reason for this will become more apparent as the discussion of this circuit develops.

The algebraic terminology used in describing the embodiment illustrated in Fig. 1 will also be used in the description of Fig. 2. In every instance the terms mean exactly the same in the following description as they did in the preceding one. The input voltage to the squaring circuit will be represented by the letter "$x$," and may be applied to control grid 26 of vacuum tube 20, as will be shown later. Appearing at control grid 27 of vacuum tube 21 will be a voltage that is substantially similar thereto but of opposite polarity and hence will be represented by the term "$-x$." It will be shown later how the voltage at control grid 27 of vacuum tube 21 can be made substantially similar, but of opposite polarity to that applied to control grid 26 of vacuum tube 20. The anodes 30 and 31 of vacuum tubes 20 and 21, respectively, are connected together and thence connected through a common load resistance 32 to a source of B+ potential 33. The screen grids 34 and 35 of vacuum tubes 20 and 21, respectively, may be connected to a source of positive potential 36 where in the particular embodiment shown, potential source 36 may be of lower value than B+ potential 33. The suppressor grids 38 and 39 of tubes 20 and 21 may be connected to their respective cathodes 41 and 42 and thence to a source of positive potential 43, the negative side of said potential being connected to ground.

In accordance with the aforementioned action of a squaring circuit, the voltage developed across the load resistance 32 will be a voltage that may be represented by the term "$-ax^2$" where "$a$" again is a proportionality factor. The voltage "$-ax^2$" developed across the load resistance 32 may be taken from junction 45, the voltage "$-ax^2$" at this junction point varying with respect to the relatively high level D.-C. potential of said point.

As the voltage "$-ax^2$" is to be applied to the subtracting means where, in the specific embodiment shown, said subtracting is to be performed by vacuum tube means, it would be desirable to apply a lower level potential to the grid. The voltage "$-ax^2$" is therefore made to vary about ground by means of a D.-C. restoring circuit. The action of this circuit is well known to those skilled in the art and in this particular embodiment comprises essentially a vacuum tube 46, a capacitance 47 and a resistance 48, wherein one side of the capacitance 47 may be connected to the junction 45, the other side of the capacitance 47 being connected through the resistance 48 to ground. The same side of the capacitance 47 may also be connected to anode 50 of vacuum tube 46, cathode 51 of vacuum tube 46 being connected to ground. The voltage at junction 52 is then substantially equal to "$-ax^2$" but at this junction, said voltage varies with respect to ground.

The voltage "$-ax^2$" may then be applied to the control grid 53 of vacuum tube 23, the result being that the voltage (due to $-ax^2$) developed across variable cathode load resistance 54 of said vacuum tube, will be of the same sign as that applied to the grid and may also be represented as "$-ax^2$." The voltage across the variable cathode resistance 54 is developed by the flow of anode current through it, and one side of cathode load resistance 54 is connected to cathode 55 of vacuum tube 23. The other side is connected to a source of negative potential 56, the positive side of potential source 56 being connected to ground. The anode 58 of vacuum tube 23 may be connected through a load resistance 59 to a source of positive potential 36. The voltage developed across the load resistance 59 may be represented by $+Gax^2$, wherein "G" is the overall gain of the amplifier stage employing vacuum tubes 22 and 23.

As the cathode 55 of vacuum tube 23 may be connected to the cathode 61 of vacuum tube 22, the voltage "$-ax^2$" appearing across the cathode load resistance 54 is applied to the grid-cathode circuit of vacuum tube 22. The anode 62 of vacuum tube 22 may be connected through a load resistance 63 to a source of positive potential 36 and appearing across said load resistance will be a voltage equal to "$-Gax^2$" wherein "G" is the overall gain of the amplifier stage employing the vacuum tubes 22 and 23.

The potential of the control grid 53 of vacuum tube 23 may be varied positively or negatively with respect to ground by means of potentiometer 64, the arm of which is connected to the control grid 53. One side of potentiometer 64 is connected to a positive biasing means 65; the other side of potentiometer 64 being connected to a negative biasing means 66. The positive side of biasing means 66 and the negative side of biasing means 65 may each be connected to ground. Variation of the potential of control grid 53 provides a means whereby the gain of vacuum tube 23 may be varied, hence allowing initial circuit conditions to be set up properly. It will also allow adjustment should vacuum tubes have to be changed.

As steady-state conditions are being described, at this stage of the discussion, the voltages appearing at the anodes 62 and 58 of vacuum tubes 22 and 23, respectively, are considered to be due only to the voltage "$x$" being applied to the squaring circuit and succeeding actions. The effect of an input "$m$" to the square root extracting circuit will now be considered separately and the overall effect will then be considered.

If an input voltage represented as "$-m$" is applied at terminal 28, the voltage is built up across a grid leak resistance 67, said voltage being applied to the control grid 69 of vacuum tube 22. The anode current controlled by this applied voltage will flow through the variable cathode resistance 54. The voltage developed across said cathode resistance 54 will be one which is of the same sign of the input voltage "$-m$" and proportional thereto. Neglecting the proportionality factor, the voltage developed across the load resistance 54 due to the aforesaid input voltage "$-m$" may be represented as "$-m$." By suitable adjustment of the cathode resistance 54, it is possible to make the aforementioned proportionality factors approximately equal to unity. The flow of anode current in vacuum tube 22 controlled by the voltage "$-m$" being applied to control grid 69 of said vacuum tube, will produce a voltage across the anode load resistance 63 of said vacuum tube that can be represented by "$+Gm$" wherein G is the overall amplification factor of the stage. As the voltage "$-m$" developed across the cathode load resistance 54 is applied to the grid cathode circuit of the vacuum tube 23, a voltage will be developed across the anode load resistance 59 of said vacuum tube that may be represented by "$-Gm$" where once again G is the overall gain in the stage.

Summing up, it is seen that at the anode 62 of the vacuum tube 22, there are two component voltages, one due to the input voltage "$-m$" applied to control grid 69 and the other due to the voltage "$-ax^2$" applied to control grid 53 of vacuum tubes 22 and 23, respectively. Subtracting the two voltages and factoring out G, the expression $G(-ax^2+m)$ is obtained. By similar reasoning, it is seen that the voltage at anode 58 of vacuum tube 23 is $G(ax^2-m)$. As the anode 62 of vacuum tube 22 is connected directly to control grid 26 of vacuum tube 20, and anode 58 of vacuum tube 23 is connected directly to control grid 27 of vacuum tube 21, it can be seen that substantially equal voltages of opposite polarity are applied to the respective control grids of vacuum tubes 26 and 27. This satisfies one of the conditions required in order that the last two mentioned tubes may perform the squaring function.

Previously it was arbitrarily assumed that the voltage appearing at the control grid 26 of vacuum tube 20 was equal to "$x$." It now appears that the voltage at anode 62 of vacuum tube 22 and hence that applied to control grid 26 of vacuum tube 20 is actually $-G(ax^2-m)$, i. e. $x=-G(ax^2-m)$. Dividing through by $Ga$, we obtain the expression $$\frac{x}{Ga}=-x^2+\frac{m}{a}$$

If "G" is made large and "$a$" approximately equal to unity, the term $$\frac{x}{Ga}$$

becomes negligible and we have remaining $x^2=m$ or $x=\sqrt{m}$. Circuit constants are so chosen and variable resistances so adjusted as to make "$a$" approximately equal to unity and "G" may have a value of as low as 10. If this is true, for all practical purposes $$\frac{x}{Ga}$$

may be neglected and the voltage output may be taken from terminal 70.

If the overall gain of the amplifier stages comprising vacuum tubes 22 and 23 and associated circuit constants does not become excessive, the square root extracting circuit herein described will remain in equilibrium. Should the voltage at output terminal 70 tend to rise above its proper value, the output of the squaring circuit will become more negative thereby lowering the potential on control grid 53 of vacuum tube 23, the resulting decrease of anode current through cathode resistance 54 will affect the plate current of vacuum tube 22 in such a manner as to cause a potential across anode load resistance 63 of vacuum tube 22 to drop to its proper value.

In the particular embodiment of the invention as illustrated in Fig. 2, the following voltages have been found to be particularly suitable: B+ potential source 33 may be 350 volts; positive potential source 36 may be 200 volts; positive potential source 43 may be 100 volts; and negative potential source 56 may be 150 volts. In the particular embodiment of Fig. 2, vacuum tubes 20 and 21 may be 6B8's, and vacuum tubes 22 and 23 may be triodes, preferably having similar characteristics and may be 6SN7's or 6SL7's. It is to be understood that other tube types may be used, but the above-mentioned ones are merely representative of particular types that may be suitable.

Although separate vacuum tubes have been shown in the drawings, it is to be understood that, if desired, their electrodes may be placed inside a single envelope as in a multi-purpose tube.

One specific application of the present invention is shown in copending application of Luis W. Alvarez, Serial No. 542,287, filed June 27, 1944, and issued August 30, 1949 as Patent No. 2,480,208, wherein it was desired to obtain a voltage that varied directly as the square root of another voltage. Other applications of the invention may be made in electrical calculating or computing machines wherein representation of square root term functions are needed. These and other applications of the present invention will readily occur to those skilled in the art.

Having thus described the invention, what is hereby claimed as new and desired to be protected by Letters Patent is:

1. An electrical system for extracting the square root from an input voltage, including a voltage squaring circuit, and a voltage amplifying circuit; means for applying the difference between the voltage output of said squaring circuit and an external input voltage as the input to said amplifying circuit, and means for impressing the voltage output of said amplifying circuit as an input voltage to said squaring circuit whereby said voltage amplifying circuit output is substantially equal to the square root of said external input voltage.

2. A square root extracting circuit, including a pair of vacuum tubes, each of said vacuum tubes having at least a cathode, grid and anode, a common cathode circuit for said pair of vacuum tubes including a load impedance, a squaring means including a pair of vacuum tubes, each of said vacuum tubes having at least a cathode, grid and anode, a common anode circuit for said last-mentioned pair of vacuum tubes including a load impedance, means for applying the output across said common anode circuit to a grid of the first of said first-mentioned pair of vacuum tubes, means for applying a negative going voltage to the grid of the second of said first-mentioned pair of vacuum tubes, an anode load impedance for each of said first-mentioned pair of vacuum tubes, means for feeding the voltage developed across each of said anode load impedances to the respective grids of said squaring tubes, said voltages across said last-mentioned impedances being substantially equal and of opposite polarity whereby the output of one of the anode circuits of the said first-mentioned pair of vacuum tubes forms the output of the square root extracting circuit.

3. A system for extracting the square root of any term represented by a voltage, comprising a voltage squaring circuit, an amplifying circuit, means for applying the difference between said voltage and the output of said squaring circuit as an input to said amplifying circuit, and means for applying the amplified difference voltage as an input to said squaring circuit whereby said amplified difference voltage is substantially equal to the root of said term.

4. A circuit according to claim 2, wherein said means for applying the output across the common anode circuit includes a direct current restoring circuit.

FRANCE B. BERGER.

REFERENCES CITED

The following references are of record in the file of this patent:

UNITED STATES PATENTS

| Number | Name | Date |
|---|---|---|
| 1,728,311 | Taylor | Sept. 17, 1929 |
| 2,199,820 | Gannett | May 7, 1940 |
| 2,428,541 | Bagley | Oct. 7, 1947 |
| 2,468,179 | Darlington et al. | Apr. 26, 1949 |